Patented Jan. 7, 1941

2,227,975

UNITED STATES PATENT OFFICE 2,227,975

POLYVINYL RESIN CONTAINING ACETAL AND/OR KETAL GROUPS AND PROCESS FOR PREPARING IT

William O. Kenyon and Wesley G. Lowe, Rochester, N. Y., assignors to Eastman Kodak Company, Rochester, N. Y., a corporation of New Jersey No Drawing. Application July 3, 1937,
Serial No. 151,945

17 Claims. (Cl. 260—66)

This invention relates to resins and a process for the preparation thereof. More particularly, this invention relates to resins of the polyvinyl acetal and polyvinyl ketal class.

Polyvinyl resins of various kinds are known. Such resins can be prepared by treatment of a polyvinyl ester with one or more aldehydes in the presence of a deesterifying agent and suitable catalysts. Such known resins suffer, however, from one or more disabilities, such as color, instability and insolubility in organic solvents, particularly if made by the processes of the prior art requiring higher temperatures and/or higher concentration of catalysts. If such methods requiring higher temperatures and/or higher concentrations of catalysts are not employed, the known processes require several hours for completion, 72 to 96 hours or more being common.

We have now found a process which gives rise to resins posssessing good color, stability and solubility in organic solvents. Furthermore, our new process requires but a comparatively short time for completion and lends itself to ready control and operation. According to our new process, we prepare polyvinyl resins by reacting polyvinyl esters with alcoholic deesterifying agents, in solution and under substantially anhydrous conditions, and then add aldehyde to form the polyvinyl resin. We do not employ deesterifying agents or catalysts containing appreciable quantities of water. We do not, however, attempt to exclude traces of water, such as are found in commercial absolute alcohols for example.

Resins prepared from polyvinyl esters and ketones are largely unknown. Only resins from cyclic ketones, such as cyclohexanone have been described. Resins from non-cyclic ketones can not be satisfactorily prepared by the prior art processes employed to prepare resins from polyvinyl esters and aldehydes. Our new process can be employed to prepare polyvinyl ketals and acetal-ketals.

It is among the objects of our invention, therefore, to provide a process for the preparation of polyvinyl acetals, polyvinyl ketals and polyvinyl acetal-ketals. A further object is to provide a process for obtaining resins of good color, stability and solubility in organic solvents. A still further object is to provide a process for obtaining such resins in a short time. A still further object is to provide polyvinyl ketal and polyvinyl acetal-ketal resins. Other more specific objects will become apparent hereinafter.

According to our new process, we prepare polyvinyl acetals by reacting a polyvinyl ester, under substantially anhydrous conditions and in solution, with an alcoholic deesterifying agent containing a hydrogen halide catalyst until the polyvinyl ester becomes water-soluble and then add an aldehyde. The aldehyde (one or more aldehydes) can be added at any time after the polyvinyl ester becomes water-soluble up to the point where the polyvinyl ester precipitates from solution or, more correctly, up to the point where the polyvinyl ester forms a gel with the alcoholic deesterifying agent.

Any alcoholic deesterifying agent can be employed. Lower aliphatic monohydric alcohols, i. e., those of the formula $C_nH_{2n+1}OH$, wherein $n$ represents 1, 2, 3 or 4, are particularly useful. Methyl and ethyl alcohols, particularly the former, are superior and are advantageously employed we have found. The polyvinyl ester can be dissolved in the alcoholic deesterifying agent alone or other solvents can be employed in conjunction with alcoholic deesterifying agent. For example, solvents such as benzene, dioxane, methylene chloride, methyl acetate or ethyl acetate can be employed in conjunction with the alcoholic deesterfying agent.

As hydrogen halide catalyst, we have found that hydrogen chloride is advantageously employed. The resins obtained employing this catalyst in our new process are characterized by particularly good stability. Hydrogen bromide is another suitable hydrogen halide catalyst, but is more expensive and less easily handled than hydrogen chloride.

Our new process does not require the application of external heat. We have found that it is advantageous to control the temperature so that it does not rise above about 40° C.

Polyvinyl esters generally are applicable to our process, but polyvinyl acetate is advantageously employed. Polyvinyl esters of all viscosities can be employed. We have found that polyvinyl esters having a viscosity of about 45 give rise to particularly useful resins. Aldehydes of all kinds, except formaldehyde, can be employed. Our new process is particularly useful for preparing acetal resins from higher aliphatic aldehydes, i. e., those of five or more carbon atoms, especially when hydrogen chloride is employed as the catalyst.

In carrying out the new process, we mix the polyvinyl ester and alcoholic deesterifying agent to form a solution. Solvents, other than the alcoholic deesterifying agent, can be employed in preparing the solution, if desired. To this solution the catalyst is added. Deesterification takes place. This is ordinarily accompanied by a decrease in the viscosity of the solution, followed by an increase in viscosity. The viscosity of the solution increases rapidly just before the deesterified polyvinyl ester precipitates from solution or, more correctly, just before the deesterifying polyvinyl ester forms a gel with the reaction mixture. Prior to gellation or precipitation and after the deesterification has proceeded until the deesterified polyvinyl ester is water-soluble (as indicated by a test portion), the aldehyde is added to the reaction mixture to form the acetal resin. We have found it advantageous to add the aldehyde gradually or portionwise. The viscosity of the reaction solution increases and, upon addition of a portion of aldehyde, it will be found to decrease and then to rise. Addition of a second portion of aldehyde again decreases the viscosity and so on. When the desired amount of aldehyde has been added and the reaction is completed, the acetal resin can be precipitated from solution by pouring the solution into water.

Polyvinyl ketals can be prepared by our new process. However, in the preparation of polyvinyl ketals, the ketone can be added to the reaction mixture at once, although in some instances, e. g., cyclic ketones, the ketone is advantageously added after the polyvinyl ester is deesterified at least to the point of water-solubility. Hydrogen chloride catalyst is a very superior catalyst for the preparation of polyvinyl ketals by our new process, we have found. In preparing mixed acetal-ketal resins, we have found it advantageous to add the ketone to the reaction mixture at first and to add the aldehyde later, advantageously after the ketone has reacted. Ketones generally can be employed.

While our new process is subject to variation, particularly as to the nature, viscosity and quantity of the polyvinyl ester employed, the nature and quantity of the aldehyde employed, the nature and quantity of the ketone employed, the nature and quantity of alcoholic deesterifying agent employed, the nature and quantity of hydrogen halide catalyst employed, the temperature employed and the methods of isolation and purification of the resins, the following examples will serve to illustrate the manner of practicing our invention.

EXAMPLE 1.—*Polyvinyl butyraldehyde acetal resin*

50 g. (0.58 mol.) of polyvinyl acetate, viscosity 45, were dissolved in 250 cc. of methanol. To this solution were added 50 cc. of a methanol solution of hydrogen chloride (2.65 normal). The mixture was allowed to stand at about 28° C. for about 4.5 hours. During this time, the viscosity of the solution passed through a minimum value and increased rapidly toward the end of the 4.5 hours. At this time a test portion of the solution was soluble in water. 50 cc. (0.57 mol.) of n-butyraldehyde were added. The temperature of the solution increased spontaneously and the viscosity decreased. The solution was allowed to stand for about 18 hours longer. It was then poured slowly into cold water to precipitate the acetal resin. The acetal resin was washed with water, until substantially free from hydrogen chloride and air dried. The air-dried resin was white and soluble in methanol and in acetone.

EXAMPLE 2.—*Polyvinyl butyraldehyde acetal resin*

The procedure of the above example was followed exactly, except that 50 cc. of 3.3 normal methanol solution of hydrogen chloride was employed. The air-dried resin was white and soluble in methanol and in acetone.

EXAMPLE 3.—*Polyvinyl butyraldehyde acetal resin*

250 g. (2.9 mol.) of polyvinyl acetate, viscosity 45, were dissolved in 1250 cc. of methanol. To this solution were added 250 cc. of a methanol solution of hydrogen chloride (4.275 normal). The resulting solution was allowed to stand until the viscosity of the solution began to increase rapidly. At this point, a test portion of the solution was water-soluble. 25 cc. (.285 mol.) of n-butyraldehyde were added. The viscosity of the solution decreased. After 15 to 20 minutes further standing, the viscosity of the solution again rose rapidly. At this point, a second 25 cc. portion of butyraldehyde was added. Again the viscosity of the solution decreased and then rose. Successive 25 cc. portions of butyraldehyde were added until 150 cc. had been introduced over a period of about 4 hours. 100 cc. more of butyraldehyde were added (bringing the total to 250 cc. or 2.85 mol.) and the reaction mixture was allowed to stand for a further period of about 15 hours. At the end of this time, the polyvinyl acetal formed had partially precipitated from solution. Acetone was added to bring it into solution. The resulting solution was poured into water to precipitate the resin. It was washed in water until free from hydrogen chloride and air dried. The air-dried resin was white and soluble in methanol and in acetone.

EXAMPLE 4.—*Polyvinyl butyraldehyde acetal resin*

The procedure of Example 3 was followed exactly, except that 200 cc. of a 5 normal methanol solution of hydrogen chloride was employed. The air-dried resin was white and soluble in methanol and in acetone.

EXAMPLE 5.—*Polyvinyl butyraldehyde acetal resin*

The procedure of Example 3 was followed exactly, except that 200 cc. (2.28 mol.) of n-butyraldehyde were employed instead of 250 cc., 50 cc. being added instead of 100 cc. just before allowing the reaction mixture to stand for 15 hours. The air-dried resin was white and soluble in methanol and in acetone.

EXAMPLE 6.—*Polyvinyl 2-ethylhexaldehyde acetal resin*

40 g. (.465 mol.) of polyvinyl acetate viscosity 45 were dissolved in 200 cc. of methanol. To this solution were added 40 cc. of a 4.925 normal solution of hydrogen chloride in methanol. The resulting solution was allowed to stand until the viscosity rose abruptly (a test portion showed water solubility). At this point, 30 cc. (.197 mol.) of 2-ethylhexylaldehyde were added. After 5 minutes the solution became milky in appearance and 20 cc. (.131 mol.) of 2-ethylhexaldehyde were added. The product precipitated from solution. It was brought back into solution by the addition of acetone to the reaction mixture and the acetal resin precipitated by pouring the solution into boiling water. The resin was washed with water until free from hydrogen chloride and air-dried. The air-dried resin was white and soluble in a mixture of methyl alcohol and acetone.

EXAMPLE 7.—*Polyvinyl heptaldehyde acetal resin*

51 g. (.58 mol.) of polyvinyl acetate of viscosity 45 were dissolved in 250 cc. of methanol.

To this solution were added 50 cc. of a 5 normal solution of hydrogen chloride in methanol. Deesterification proceeded until the viscosity of the solution increased and a test portion was soluble in water. 30 cc. (.215 mol.) of heptaldehyde in three 10 cc. portions were added rapidly. Precipitation occurred immediately after addition of the third portion. The resin obtained was dissolved in a mixture of acetone and methanol and precipitated by pouring the solution into water. The resin was washed with water until free from hydrogen chloride. The resin was air-dried. The air-dried resin was white and soluble in a mixture of acetone and methyl alcohol.

EXAMPLE 7A.—*Polyvinyl 2-ethylbutyraldehyde acetal resin*

51 g. (.58 mol.) of polyvinyl acetate of viscosity 45 were dissolved in 250 cc. of methanol. To this solution were added 50 cc. of a 5 normal solution of hydrogen chloride in methanol. Deesterification proceeded until the viscosity of the solution increased and a test portion was soluble in water. 30 cc. (.249 mol.) of 2-ethylbutyraldehyde were added in 10 cc. portions. The acetal resin formed and precipitated from solution. The white resin thus obtained was dissolved in a mixture of methanol and acetone and precipitated by pouring the solution into hot water. The resin was washed with water until free from acid and then air-dried.

EXAMPLE 8.—*Polyvinyl butyraldehyde heptaldehyde acetal resin*

42.5 g. (.5 mol.) of polyvinyl acetate viscosity 45 were dissolved in about 200 cc. of methanol. To this solution were added 50 cc. of a 4.6 normal solution of hydrogen chloride in methanol. After 85 minutes, deesterification had proceeded to the point of water solubility. 15 cc. (.107 mol.) of heptaldehyde were added. After an hour, 15 cc. (.17 mol.) of n-butyraldehyde were added. After 15 hours standing, the acetal resin precipitated. The resin was dissolved in a mixture of acetone, methanol and chloroform and precipitated by pouring the solution into water.

EXAMPLE 9.—*Polyvinyl cyclohexanone ketal resin*

7 g. (.08 mol.) of polyvinyl acetate of viscosity 45 were dissolved in about 105 cc. of methanol. To this solution were added 20 cc. of a 2.09 normal solution of hydrogen chloride in methanol and 10 cc. (.1 mol.) of cyclohexanone. The whole was thoroughly mixed and allowed to stand at about 20° C. for about 60 minutes. 20 cc. of a 2.09 normal solution of hydrogen chloride were now added and the resulting mixture was allowed to stand for an additional 3.5 hours. The ketal resin was precipitated by pouring the reaction mixture into boiling water. It was washed with water until free from hydrogen chloride and then air-dried. The resin was white and soluble in methanol and acetone.

EXAMPLE 10.—*Polyvinyl cyclohexanone ketal resin*

50 g. (.58 mol.) of polyvinyl acetate of viscosity 45 were dissolved in about 250 cc. of methanol. To this solution were added 50 cc. of a 2.65 normal solution of hydrogen chloride in methanol. Deesterification took place. When the viscosity of the solution rose abruptly and a test portion thereof was water soluble, 75 cc. (.75 mol.) of cyclohexanone were added. The resulting solution was allowed to stand about 12 hours. The ketal resin was precipitated by pouring the reaction mixture into water. The precipitated resin was redissolved in methanol and reprecipitated into water until free from hydrogen chloride. The resin was air-dried. The air-dried resin was white.

EXAMPLE 11.—*Polyvinyl acetone ketal resin*

100 g. (1.16 mol.) of polyvinyl acetate of viscosity 45 were dispersed in a mixture of 500 cc. of methanol and 500 cc. (6.8 mol.) of acetone. To this solution were added 100 cc. of a 4 normal solution of hydrogen chloride in methanol. After standing about 18 hours, the reaction mixture was poured into cold water to precipitate the ketal resin. The resin was washed free from hydrogen chloride and air-dried. The resin was white and soluble in acetone, methanol or a mixture of the two.

EXAMPLE 12.—*Polyvinyl butyraldehyde acetal acetone ketal resins*

33 g. (.27 mol.) of polyvinyl acetate of viscosity 45 were dissolved in 175 cc. of methanol. To this solution were added 33 cc. of a 2.65 normal solution of hydrogen chloride in methanol. The resulting solution was allowed to stand at about 28° C. for about 4 hours and 20 minutes. 33 cc. (.68 mol.) of acetone were added. The resulting solution was allowed to stand about 30 minutes. 75 cc. of a 2.65 normal solution of hydrogen chloride in methanol were added along with 50 cc. (.68 mol.) of acetone. The resulting mixture was allowed to stand. Before gelation, 25 cc. (.285 mol) of n-butyraldehyde were added. Heat was generated. After further standing for about 30 minutes, the acetal-ketal resin was precipitated by pouring the solution into water. It was washed free from hydrogen chloride and air-dried. The resin was white and soluble in a mixture of chloroform (75% by volume) and methanol.

EXAMPLE 13.—*Polyvinyl butyraldehyde acetal acetone ketal resin*

86 g. (1 mol.) of polyvinyl acetate of viscosity 45 were dissolved in about 415 cc. of methanol. To this solution were added 50 cc. of a 7.29 normal solution of hydrogen chloride in methanol. The resulting solution was allowed to stand at about 20° C. until a test portion was water soluble, when 25 cc. (.34 mol.) of acetone were added. The resulting solution was allowed to stand for a further period of about 1 hour, when 25 cc. (.34 mol.) of acetone were added. The resulting solution was allowed to stand for a further period of about 1 hour, when 25 cc. (.34 mol.) of acetone were added. The resulting solution was allowed to stand about 3 hours, when 50 cc. (.57 mol.) of n-butyraldehyde were added. The resulting mixture was allowed to stand for about 16 hours. The acetal-ketal resin was precipitated by pouring the reaction mixture into cold water. The resin was washed free from hydrogen chloride and air-dried. The resin was white and soluble in methanol and in acetone.

EXAMPLE 14.—*Polyvinyl acetaldehyde acetal acetophenone ketal resin*

250 g. (2.9 mol.) of polyvinyl acetate of viscosity about 45 were dissolved in about 1250 cc. of methanol. To this solution were added 250 cc. of a 4.93 normal solution of hydrogen chloride in methanol. The resulting solution was allowed to stand at 20° C. until a test portion was water soluble, when 160 cc. (1.375 mol.) of acetophenone were added. After about 30 minutes standing, 50 cc. (.82 mol.) of acetaldehyde were added. 30 minutes later, 100 cc. (1.62 mol.) of acetaldehyde were added. The resulting mixture was allowed to stand for about 12 hours, when the acetal-ketal resin was precipitated by pouring the reaction mixture into cold water. The resin was washed free from hydrogen chloride and air-dried. The air-dried resin was white and soluble in a mixture of methanol (50% by volume) and acetone.

EXAMPLE 15.—*Polyvinyl butyraldehyde acetal methyl ethyl ketone ketal resin*

43 g. (.5 mol.) of polyvinyl acetate of viscosity 45 were dissolved in about 200 cc. of methanol. To this solution were added 50 cc. of a 4.6 normal solution of hydrogen chloride in methanol. The resulting solution was allowed to stand at 20° to 25° C. until the solution was viscous and a test portion water soluble. 25 cc. (.28 mol.) of methyl ethyl ketone were added. The resulting solution was allowed to stand for about one hour, when 15 cc. (.17 mol.) of n-butyraldehyde were added. The resulting solution was allowed to stand for about 15 hours. The acetal-ketal resin was precipitated by pouring the reaction mixture into cold water. The resin was washed free from hydrogen chloride and air-dried. The air-dried resin was white and soluble in methanol.

EXAMPLE 16.—*Polyvinyl butyraldehyde acetal acetophenone ketal resin*

210 g. (2.4 mol.) of polyvinyl acetate of viscosity 45 were dissolved in 1060 cc. of methanol. To this solution were added 200 cc. of a 5.2 normal solution of hydrogen chloride in methanol. The resulting solution was allowed to stand at 20° to 25° C. until the solution was viscous and a test portion was water-soluble. 100 cc. (.86 mol.) of acetophenone were then added. When the viscosity of the solution again rose abruptly, a further 100 cc. (.86 mol.) of acetophenone were added. When the viscosity of the solution again rose abruptly, a further 50 cc. (.43 mol.) of acetophenone were added. One hour later, 100 cc. (1.14 mol.) of n-butyraldehyde were added, and after another hour, a further 100 cc. (1.14 mol.) of n-butyraldehyde were added. After standing a further 15 hours, the acetal-ketal resin was precipitated by pouring the solution into water. The precipitated resin was dissolved in acetone and reprecipitated in water as often as necessary to free the resin from hydrogen chloride. The resin was air-dried. It was soluble in acetate and methanol.

EXAMPLE 17.—*Polyvinyl acetaldehyde acetal resin*

150 g. (1.74 mol.) of polyvinyl acetate of viscosity 45 were dissolved in 750 cc. of methanol. To this solution were added 109 cc. of a 5.72 normal solution of hydrogen chloride in methanol. The resulting solution was allowed to stand at 20° to 25° C. until a test portion was soluble in water. At this point 10 cc. of acetaldehyde were added with stirring. When the viscosity of the solution increased abruptly, another 10 cc. of acetaldehyde were added. Acetaldehyde was added in 10 cc. portions in this manner over a period of about 2 hours until 88 g. (2 mol.) of acetaldehyde had been added. The solution was allowed to stand a further 18 hours. The solution was then diluted with one liter of acetone. The acetal resin was then immediately precipitated by pouring the resulting solution into cold water. The resin was washed free of hydrogen chloride with water. It was air-dried. The air-dried resin was white and soluble in a mixture of acetone (80% by volume) and methanol.

EXAMPLE 18.—*Polyvinyl acetaldehyde butyraldehyde acetal resin*

150 g. (1.74 mol.) of polyvinyl acetate of viscosity 45 were dissolved in 750 cc. of methanol. To this solution were added 109 cc. of a 5.72 normal solution of hydrogen chloride in methanol. The resulting solution was allowed to stand at 20° to 25° C. until a test portion was soluble in water. At this point 10 cc. of an equimolar mixture of n-butyraldehyde and acetaldehyde were added with stirring. When the viscosity of the solution increased abruptly, another 10 cc. portion of the equimolar mixture of aldehydes was added. The equimolar mixture of aldehydes was added in 10 cc. portions in this manner over a period of about 2 hours until 116 g. of the mixture, i. e. a mole of each of the aldehydes had been added. The solution was allowed to stand a further 18 hours. The solution was then diluted with one liter of acetone and the acetal resin immediately precipitated by pouring the resulting solution into cold water. The resin was washed free from hydrogen chloride with water. It was air-dried. The air-dried resin was white and soluble in acetone.

EXAMPLE 19.—*Polyvinyl acetaldehyde acetal benzophenone ketal resin*

21 g. (.24 mol.) of polyvinyl acetate of viscosity 45 were dissolved in about 106 cc. of methanol. To this solution were added 25 cc. of a 5.35 normal solution of hydrogen chloride in methanol. The resulting solution was allowed to stand at 20° to 25° C. until the solution was viscous and a test portion water soluble. 10 cc. (.11 mol.) of benzophenone were added. An hour later, 20 cc. (.39 mol.) of acetaldehyde were added. The resulting solution was allowed to stand about 12 hours. The acetal-ketal resin was precipitated by pouring the reaction mixture into cold water. The precipitated resin was washed free from hydrogen chloride and air-dried. The air-dried resin was soluble in methanol and in acetone.

EXAMPLE 20.—*Polyvinyl furfuraldehyde acetal resin*

250 g. (2.9 mol.) of polyvinyl acetate of viscosity 45, were dissolved in 1250 cc. of methanol. To this solution were added 60 cc. of a 5 normal solution of hydrogen chloride in methanol. After 5.5 hours 40 cc. of a 5 normal solution of hydrogen chloride in methanol were added. The resulting solution was allowed to stand at 20° to 25° C. until a test portion was water soluble. 15 cc. of water and 200 cc. (2.4 mol.) of freshly distilled furfuraldehyde were then added, the furfuraldehyde being added in two 100 cc. portions. The resulting solution assumed a light tan color after a few minutes and was then poured into water to precipitate the acetal resin as a white product. The precipitated resin was washed free from hydrogen chloride and air-dried. The air-dried resin was white and soluble in acetone.

EXAMPLE 21.—*Polyvinyl acetaldehyde furfuraldehyde acetal resin*

100 g. (1.3 mol.) of polyvinyl acetate, of viscosity 45, were dissolved in 500 cc. of methanol. To this solution were added 90 cc. of a 3.9 normal solution of hydrogen chloride in methanol. The resulting solution was allowed to stand at about 20° to 25° C. for about 105 minutes when a test portion was water soluble. 6 cc. (.12 mol.) of acetaldehyde were added. After half an hour, 15 cc. of water and 100 cc. (1.2 mol.) of furfuraldehyde were added. After a few minutes the resulting solution was poured into water to precipitate the resin. The precipitated resin was washed free from hydrogen chloride and air-dried. The air-dried resin was white and soluble in acetone.

In the latter two examples, the addition of a small amount of water at the point of adding the furfuraldehyde decreases the color which tends to be caused by the furfuraldehyde. It is unnecessary to add the water if the reaction mixture is precipitated into water as soon as it assumes a light color.

In any of the above examples where the acetal resin tends to precipitate from the alcoholic deesterifying agent solution, it can be held in solution or brought back into solution by addition of suitable solvents, e. g. dioxane or ethyl acetate.

We have found that a catalyst concentration of from about 0.25 mole to about 0.5 mole of hydrogen halide catalyst per mole of polyvinyl acetate is advantageously employed. Other catalyst concentrations can be employed.

We have found that the total moles of aldehyde and/or ketone are advantageously about equal to the moles of polyvinyl ester, although other concentrations of aldehyde and/or ketone can be employed.

In all of the above examples, the resins are advantageously washed to free them from hydrogen halide catalyst by dissolving in a suitable solvent and reprecipitating in water and repeating this process as often as necessary.

When adding the hydrogen halide catalyst to the alcoholic solution of the polyvinyl ester precipitation of the polyvinyl ester may occur momentarily. Such precipitates redissolve upon agitation. When adding the aldehydes or ketones to the reaction mixtures, agitation or stirring is advantageously employed in order to insure thorough dispersion throughout the reaction mixture.

The herein described resins are useful for the manufacture of transparent sheet or film and useful for the manufacture of coating compositions, lacquers and the like. To prepare a transparent film or sheet from our resins, we first prepare a flowable composition of the resin, using non-corrosive solvents, such as acetone or acetone mixed with other non-corrosive, low-boiling solvents, e. g. methanol or chloroform. The flowable compositions are then spread on a film-forming surface, such as glass or metal plate or a revolving drum, to desired thinness. The volatile portion of the composition is allowed to evaporate, or the evaporation is accelerated by heating, such as with warm air, and the film or sheet is stripped from the film-forming surface. The detached film or sheet is then subjected to curing by heating with warm air at suitable temperatures, in a manner well known to those skilled in the art. Sheet or film of our resins can be employed as a support for light-sensitive photographic coatings.

Our resins can be pressed into blocks and skived to thin sheets or layers which can be used as a laminating material between sheets of glass, particularly if suitably plasticized. Our resins are compatible with a number of plasticizers, such as tributyl phosphate, triphenyl phosphate, tricresyl phosphate, diamyl phthalate, dibutyl phthalate, di- and triglyceryl esters, such as acetates, propionates, butyrates and the like, glycerol acetal esters, such as butyraldehyde acetal of glyceryl monoacetate, monobutyrate, monovalerate or the like, glycerol acetal ethers, such as the acetaldehyde acetal of glycerol monoethyl ether or dodecyl-ether, monochloronaphthalene and the like.

Our resins can be successfully molded or extruded when suitably plasticized.

In the examples, the degree of polymerization of the polyvinyl esters employed is indicated by stating the viscosity of their monomeric molar solutions (86.05 g. per liter for vinyl acetate) in benzene at 20° C. Mixed polyvinyl esters, such as the polyvinyl esters obtained by polymerizing a mixture of vinyl acetate and vinyl butyrate or vinyl acetate and vinyl chloracetate or vinyl acetate and vinyl ethyl ether, for example, can be employed in our new process.

What we claim as our invention and desire to be secured by Letters Patent of the United States is:

1. A process for preparing a polyvinyl resin comprising reacting, under substantially anhydrous conditions and in solution in an alcoholic deesterifying agent, a polyvinyl ester with the alcoholic deesterifying agent, in the presence of a hydrogen halide catalyst, until the polyvinyl ester is water soluble but still soluble in the alcoholic deesterifying agent, and then adding at least one compound selected from the group consisting of aldehydes of at least two carbon atoms and ketones to form the polyvinyl resin.

2. A process for preparing a polyvinyl resin comprising reacting, under substantially anhydrous conditions and in solution in an alcoholic deesterifying agent, a polyvinyl acetate with the alcoholic deesterifying agent, in the presence of a hydrogen halide catalyst, until the polyvinyl acetate is water soluble but still soluble in the alcoholic deesterifying agent, and then adding at least one compound selected from the group consisting of aldehydes of at least two carbon atoms and ketones to form the polyvinyl resin.

3. A process for preparing a polyvinyl resin comprising reacting, under substantially anhydrous conditions and in solution in an alcoholic deesterifying agent, a polyvinyl acetate with the alcoholic deesterifying agent, in the presence of hydrogen chloride catalyst, until the polyvinyl acetate is water soluble but still soluble in the alcoholic deesterifying agent, and then adding at least one compound selected from the group consisting of aldehydes of at least two carbon atoms and ketones to form the polyvinyl resin.

4. A process for preparing a polyvinyl resin comprising reacting, under substantially anhydrous conditions and in solution in a methyl alcoholic deesterifying agent, a polyvinyl acetate with the methyl alcoholic deesterifying agent, in the presence of hydrogen chloride catalyst, until the polyvinyl acetate is water soluble but still soluble in the alcoholic deesterifying agent, and then adding at least one compound selected from the group consisting of aldehydes of at least two carbon atoms and ketones to form the polyvinyl resin.

5. A process for preparing a polyvinyl resin comprising reacting, under substantially anhydrous conditions and in solution in a methyl alcoholic deesterifying agent, a polyvinyl acetate with the methyl alcoholic deesterifying agent, in the presence of hydrogen chloride catalyst, until the polyvinyl acetate is water soluble but still soluble in the methyl alcoholic deesterifying agent, and then adding at least one compound selected from the group consisting of aldehydes of at least two carbon atoms and ketones to form the polyvinyl resin at a temperature of not more than about 40° C.

6. A process for preparing a polyvinyl resin comprising reacting, under substantially anhydrous conditions and in solution in a methyl alcoholic deesterifying agent, a polyvinyl acetate with the methyl alcoholic deesterifying agent, in the presence of hydrogen chloride catalyst, until the polyvinyl acetate is water soluble but still soluble in the methyl alcoholic deesterifying agent, and then adding an aldehyde of at least two carbon atoms to form the polyvinyl resin.

7. A process for preparing a polyvinyl resin comprising reacting, under substantially anhydrous conditions and in solution in a methyl alcoholic deesterifying agent, a polyvinyl acetate with the methyl alcoholic deesterifying agent, in the presence of hydrogen chloride catalyst, until the polyvinyl acetate is water soluble but still soluble in the methyl alcoholic deesterifying agent, and then adding an aldehyde of at least five carbon atoms to form the polyvinyl resin.

8. A process for preparing a polyvinyl resin comprising reacting, under substantially anhydrous conditions and in solution in a methyl alcoholic deesterifying agent, a polyvinyl acetate with the methyl alcoholic deesterifying agent, in the presence of hydrogen chloride catalyst, until the polyvinyl acetate is water-soluble but still soluble in the methyl alcoholic deesterifying agent, and then adding a ketone to form the polyvinyl resin.

9. A process for preparing a polyvinyl resin comprising reacting, under substantially anhydrous conditions and in solution in an alcoholic deesterifying agent, a polyvinyl ester with the alcoholic deesterifying agent and a non-cyclic ketone, in the presence of hydrogen chloride catalyst.

10. A polyvinyl resin containing ketal groups which are formed from a non-cyclic ketone.

11. A polyvinyl resin containing ketal groups which are formed from a non-cyclic aliphatic ketone.

12. A polyvinyl acetal-ketal resin in which the acetal groups are formed from an aliphatic aldehyde of at least two carbon atoms and the ketal groups are formed from a non-cyclic aliphatic ketone.

13. A polyvinyl acetal-ketal resin in which the acetal groups are formed from an aliphatic aldehyde of at least two carbon atoms and the ketal groups are formed from a non-cyclic aromatic ketone.

14. A polyvinyl acetal-ketal resin in which the acetal groups are formed from butyraldehyde and the ketal groups are formed from acetone.

15. A polyvinyl acetal-ketal resin in which the acetal groups are formed from acetaldehyde and the ketal groups are formed from acetophenone.

16. A polyvinyl acetal-ketal resin in which the acetal groups are formed from an aliphatic aldehyde of at least two carbon atoms and the ketal groups are formed from benzophenone.

17. A process for preparing a polyvinyl resin comprising reacting, under substantially anhydrous conditions and in solution in a methyl alcoholic deesterifying agent, a polyvinyl acetate with the methyl alcoholic deesterifying agent, in the presence of hydrogen chloride catalyst, until the polyvinyl acetate is water-soluble but still soluble in the methyl alcoholic deesterifying agent, and then adding gradually an aldehyde of at least two carbon atoms to form the polyvinyl resin.

WILLIAM O. KENYON.
WESLEY G. LOWE.